(12) United States Patent
Mann

(10) Patent No.: US 7,216,601 B1
(45) Date of Patent: May 15, 2007

(54) APPARATUS AND METHOD FOR A DUAL HULL BOAT WITH CONTROL GATE

(76) Inventor: Larry Wayne Mann, 5328 Reimers Rd., Spicewood, TX (US) 78669

( * ) Notice: Subject to any disclaimer, the term of this patent is extended or adjusted under 35 U.S.C. 154(b) by 0 days.

(21) Appl. No.: 11/296,239

(22) Filed: Dec. 8, 2005

Related U.S. Application Data

(60) Provisional application No. 60/633,455, filed on Dec. 6, 2004.

(51) Int. Cl.
*B63B 1/32* (2006.01)

(52) U.S. Cl. .......................... 114/288; 114/285; 440/69

(58) Field of Classification Search ................. 114/271, 114/274, 280, 284, 285, 286, 288, 289, 290, 114/291; 440/68, 69
See application file for complete search history.

(56) References Cited

U.S. PATENT DOCUMENTS

| | | | |
|---|---|---|---|
| 3,678,874 A | | 7/1972 | Flink |
| 4,341,177 A | * | 7/1982 | Miyazaki et al. ........... 114/288 |
| 4,458,622 A | | 7/1984 | Anderson |
| 4,713,028 A | * | 12/1987 | Duff ............................ 440/69 |
| 4,915,668 A | * | 4/1990 | Hardy ........................ 440/69 |
| 4,977,845 A | * | 12/1990 | Rundquist ................... 114/289 |
| 5,549,071 A | | 8/1996 | Pigeon |
| 5,860,384 A | | 1/1999 | Castillo |
| 6,105,527 A | | 8/2000 | Lochtefeld et al. |
| 6,332,816 B1 | * | 12/2001 | Tsuchiya et al. ............. 440/40 |

OTHER PUBLICATIONS http://www.correctcraft.com/main.trm#Scene_1 "Our Boats—CrossOver—AirSV211".

* cited by examiner

*Primary Examiner*—Lars A. Olson

(57) ABSTRACT

The current invention is an apparatus and method for an inner and outer dual hull boat capable of transforming between different levels of planing ability. The design is a gateway in the outer hull which allows water to pass through the void between the inner and outer hull. By controlling the position of a gate, the flow of water through the gateway in the forward moving boat can be controlled, which allows for the control of the planing or displacement capacity of the boat.

15 Claims, 5 Drawing Sheets

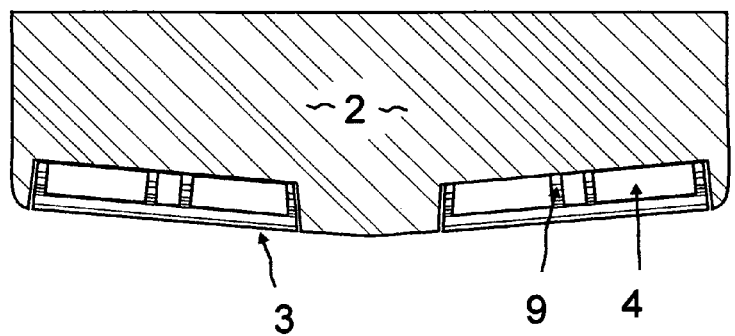
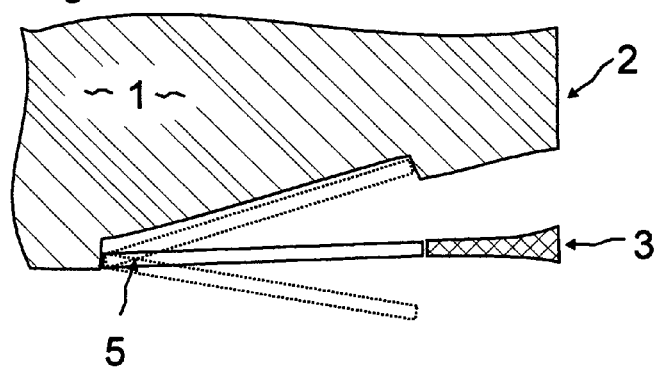
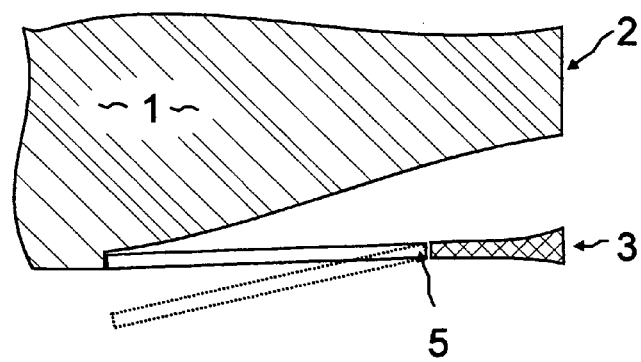

APPARATUS AND METHOD FOR A DUAL HULL BOAT WITH CONTROL GATE

CROSS-REFERENCE TO RELATED APPLICATIONS

This application is related to and claims the benefit of Provisional Patent Application No. 60/633,455, dated Dec. 6, 2004.

FEDERALLY SPONSORED RESEARCH

Not applicable

SEQUENCE LISTING OR PROGRAM

Not applicable

FIELD OF INVENTION

This invention relates to boats. More particularly, the invention relates to an apparatus and method for an inner and outer dual hull boat capable of transforming between different levels of planing ability.

BACKGROUND OF THE INVENTION

Boat manufacturers strive to develop boats to work for as many different situations as possible; an attempt at one boat does it all. For years, water-ski tournament boats were designed to produce as little wake as possible to cater to the slalom water ski market. The market changed and wakeboard "water-skiers" demanded boats that produced large wakes. Now with the sport of wake surfing growing, there is demand for boats that produce a larger wake at slower speeds. Also, wake surfers will want to ride on either the left or the right side of the boat. Currently, to shift from left to right requires repositioning ballast. It is likely that the people in the boat will want to do all of these activities in the same outing. Designing a boat to perform well for all these demands is difficult with current technology.

For larger ocean capable boats, a displacement hull is advantageous in that it rides deeper in the water thus riding through the waves. Displacement hulls also consume comparatively less fuel when underway, but can only attain slower boat speeds. To attain higher speeds, a planing hull is needed. Planing hulls ride higher in the water when operating at higher speeds. The disadvantage is that by riding more on the top of the waves as opposed to riding through them, planing hull boats "bounce" across wave tops and therefore the ride is not as smooth as that of a displacement hull. It would be advantageous if the boat's operator could modify a boat hull's performance during operation.

A boat hull that has an upward curved rocker towards the stern will ride deeper in the water. This is a shape frequently utilized in a displacement hull.

In order to produce a boat that produces a small wake, the hull of a boat can have a reverse rocker (a slight downward turn) near the stern of the boat. This reverse rocker creates a lifting effect on the rear of the boat, causing the rear of the boat to ride higher in the water when moving forward, thus decreasing the wake size. Most tournament ski boats incorporate this reverse rocker.

Another method for reducing the size of the boat's wake is with trim tabs. Trim tabs are plates that mount to the boat's transom, or to the hull of the boat forward of the transom, and then extend rearward from there. The front end of the trim tab is typically flush with the bottom of the boat and frequently attached by a hinge joint. The rear end of the trim tab may be fixed or adjustable up and down, typically by hydraulic linear actuators. With the trim tab in the up position, there is little or no force on the water generated by the trim tab. With the trim tab in the down position, the trim tab creates an upward force on the rear of the boat. Trim tabs increase the versatility of boats. With motor driven or hydraulic trim tabs, the boat's operator can adjust them while the boat is underway and modify the performance of the boat.

One approach to increasing the size of the boat's wake is with the use of underwater wings. These wings are "upside-down" hydrofoils that generate downward force when the boat is moving forward. One example of this downward force hydrofoil is the "Wedge" commercially available on Malibu brand tournament ski boats. Another example is U.S. Pat. No. 6,105,527 which describes the use of "upside-down" hydrofoils to enhance wake size.

Another approach to increasing the size of the boat's wake is water ballast. There is significant prior art for boat ballast such as U.S. Pat. No. 5,787,835 and U.S. Pat. No. 6,234,099. Wake surfers add a few hundred pounds of ballast, or even more; as much as 2,000 pounds. While this produces a larger wake, it reduces the performance and safety margin of the boat.

Yet another approach to increasing the size of the wake is to add wave forming protuberances to the sides of the boat as taught in U.S. Pat. No. 6,105,527. While perhaps functional, this approach is not practical as the boat would be unable to utilize existing trailers, boat lifts or typical docking facilities.

Another approach to develop a multi-functional boat hull is commercially available on some Correct Craft brand tournament ski boats. Specific Correct Craft boats have a feature called Hydro-Gate™ that is a vertically oriented plate at the center of the transom of the boat. It can be retracted out of the flow of water or extended into the flow of water passing beneath the boat. When extended into the down position, into the water, it creates a lifting force on the rear of the boat.

THE CURRENT INVENTION

With current technology, a specific boat hull can readily be designed to function somewhere within the range from a planing hull to a displacement hull; however, only a single function along this continuum is possible in a specific hull design. As noted above, numerous methods exist to increase the functional range of a boat hull.

In the current invention, two hull designs are incorporated into one boat. One of the designs is for a hull with increased planing capability, hereinafter referred to as the planing hull. The second design is for a hull with increased displacement capability, hereinafter referred to as the displacement hull. Typically the displacement hull will be located within the planing hull.

An opening in the outer hull is created for the mounting of a gate. In the closed position, the gate forms an integral component of the outer hull. When water is flowing under the moving boat, the closed gate prevents the flowing water from reaching and interacting with the inner hull. If the outer hull is a planing hull, with the gate closed the boat functions according to its planing hull design.

When the gate is opened, the water flowing under the moving boat now flows through the opening of the gate, through the cavity between the two hulls, and flows along the inner hull. If the inner hull is a displacement hull, with the gate open the boat functions according to its displacement hull design.

The gate can be retracted, extended, or removed. If retracted or extended, the movement can be accomplished manually or by using at least one actuator. If the actuator is electrically operated, the boat operator can control the position of the gate, thus enabling the operator to control the function of the boat hull while the boat is underway. In the alternative, a programmable logic circuit can control the movement of the actuator to control the position of the gate based upon boat speed, the boat's planing angle, water conditions and the boat operator's requirements.

OBJECTS AND ADVANTAGES OF THE CURRENT INVENTION

One object of the current invention is to develop a boat capable of producing larger waves without adding a substantial amount of ballast to the boat. This is advantageous because it would make the boat safer and more convenient to operate than adding ballast. Another object of the current invention is to develop a water sports boat capable a satisfying numerous functional demands. Yet another object of the current invention is to develop a boat as described above that does not have apparatus that projects from the hull of the boat but accomplishes the above described objects with apparatus that is integral to a more conventional boat hull.

An unexpected advantage of the current invention is that it allows the design of a boat hull that has a greater range of function between a displacement hull and a planing hull. Another unexpected advantage of the current invention is that it can improve the performance, speed or fuel efficiency of larger ocean capable boats.

DESCRIPTION—FIGURES

FIG. 1 is a rear view of the boat transom showing exit openings;

FIG. 2a is a schematic side view of a fore mounted gate;

FIG. 2b is a schematic side view of an aft mounted gate;

DRAWINGS—REFERENCE NUMERALS

Figure 3A:
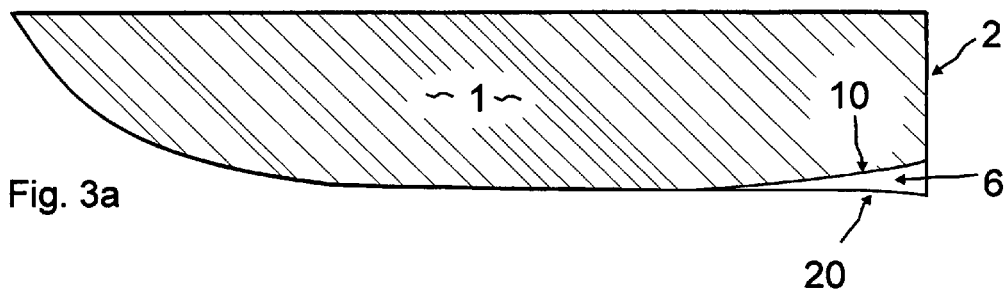
FIG. 3a is a side view of 2 boat hulls superimposed over each other.

1 Boat hull
2 Boat transom
3 Outer hull structure
4 Exit opening
5 Gate
6 Cavity
7 Flexible joint or hinge or pivot
8 Linear actuator
9 Vertical member
10 Inner hull
20 Outer hull

Description of the Basic Dual Hull with Gate Opening

Figure 3B:
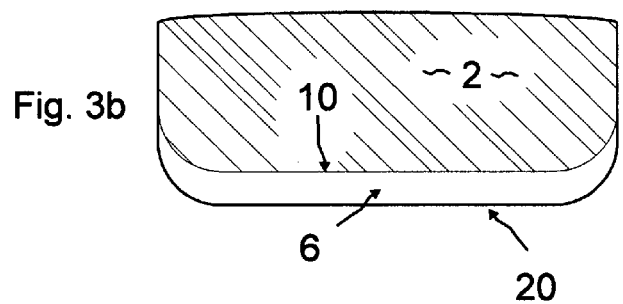
FIG. 3b is a rear view of the boat transom showing the inner and outer boat hulls superimposed.
Figure 4:
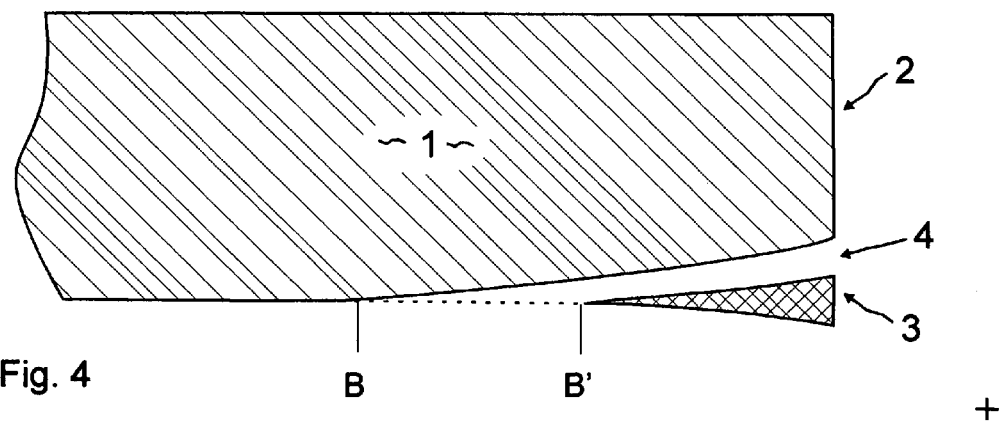
FIG. 4 is a side view of 2 superimposed boat hulls with the gate opening depicted by B to B'.

An opening for a gate, or gateway, can be located anywhere along the length of the hull; however, it serves no purpose if located fore of where the waterline intersects the forward moving boat. Consequently, the gateway location is more practical placed towards the aft end of the hull. Subsequently, the two hull designs need to differ aft of the opening of the gateway as shown at B in FIG. 4 with the opening of the gateway represented by B to B'. The inner hull 10 and the outer hull 20 are depicted in FIGS. 3a and 3b. There is a void or cavity 6 located between the inner hull 10 and the outer hull 20 and is also depicted in FIGS. 3a and 3b. The cavity has at least one exit opening 4 in the vicinity of the transom 2 as shown in FIG. 4 which allows water entering through the gateway opening B to B' to pass through the cavity 6 and through the exit opening 4.

Description of the Basic Gate

In order to control the flow of water through the gateway, and thus the flow of water through the cavity 6 and under the inner hull 10, the gateway opening must have a gate that can be closed, or opened or removed. In order for the gate 5 to function as part of the outer hull 20 when closed flush with the outer hull 20, the gate 5 needs to be largely planar. The gate 5 can be hinged on one edge like a conventional gate in a fence, withdrawn like the gate in a gate valve, rotated along an axis like a butterfly valve, rotated out of position blocking the gate opening, any other motion of common gates, or simply removed.

The gate 5 can be hinged at the aft, or rear edge as shown in FIG. 2b. When hinged at the rear, the gate 5 would be closed when in the up position (shown by solid lines). When hinged at the rear, the gate 5 would be open when in the down position (shown by dotted lines). When in the open position, due to its angle of inclination, the gate 5 will provide additional downward force on the forward moving boat. While advantageous for increasing downward force on the forward moving boat, an open gate hinged at the rear is susceptible to damage from striking solid objects within the water, such as a floating log or tree stump. The gate could also be hinged from either side. This also presents susceptibility to striking solid objects in the water and does not allow for the gate to be fully opened.

The gate 5 can also be hinged at the fore, or leading edge as shown in FIG. 2a. When hinged at the fore edge of the gate 5, the gateway is closed when the gate 5 is in the middle position (shown by solid lines). Also, in the closed position, the gate 5 would function as part of the outer hull 20. When hinged at the fore edge, the gate 5 would be open when in the up position (shown by upper dotted lines). The gate 5 hinged at the fore edge, whether opened or closed, is not susceptible to striking solid objects in the water. Another advantage to positioning the hinge 7 at the fore edge is that the trailing edge of the gate 5 could be pushed downward, past flush with the hull 20, as shown by the gate 5 (lower set of dotted lines) in FIG. 2a. This would allow the gate to act as a conventional trim tab.

The gate 5 can be manufactured from any conventional material, such as formed sheet metal, flat plate metal, plastic, composite, or any other isotropic or anisotropic materials. The gates shown in the Figures are rectangular and generally flat but shapes other than rectangular and contours other than flat are envisioned; specifically, contours that cause all edges of the gate to be within the proximity of flush with the outer hull 20 when in the closed position.

Description of the Basic Cavity Between the Two Hulls

The cavity 6 is the space between the inner hull 10 and the outer hull 20. The floor of the cavity 6 is the "roof" of the outer hull 20. The outer hull 20 is depicted as a line in FIGS. 3a and 3b. Due to the structural requirements of the boat, it is most likely that the outer hull 20 will be thick enough to support the weight of the boat and its load, such as depicted in FIG. 4, item 3, hereinafter referred to as outer hull structure 3. To further strengthen outer hull structure 3, vertical members can span between the inner hull 10 and the outer hull 20 as shown in FIG. 1 and depicted as vertical member 9.

If the outer hull 20 is designed as more of a planing hull and the inner hull 10 is designed as more of a displacement hull, and the outer hull 20 were completely removed, the inner hull 10 would allow the boat to function in its most displacement hull capacity. Since the outer hull 20 remains in place during operation of the boat, even with the gateway open, water continues to flow under the outer hull 20 and any upward lift provided by the planing capacity of the design of the outer hull 20 will continue to provide the same degree of upward lift to the forward moving boat. Generally, the lift at the aft of a planing hull is provided by a slight declination (fore to aft) of the aft surface of the planing hull as shown in FIG. 3a. To counteract this upward lift, the floor of the cavity 6 can be inclined (fore to aft) to the same degree that the outer hull 20 is declined, as shown in the outer hull structure 3 in FIG. 4. Thus, when the gateway is open, the boat can function in its designed displacement capacity because the upward forces and the downward forces generated by outer hull structure 3 balances, or cancel each other.

Detailed Description of Embodiment—Boat Hull with Fore Mounted Gates

Figure 7:
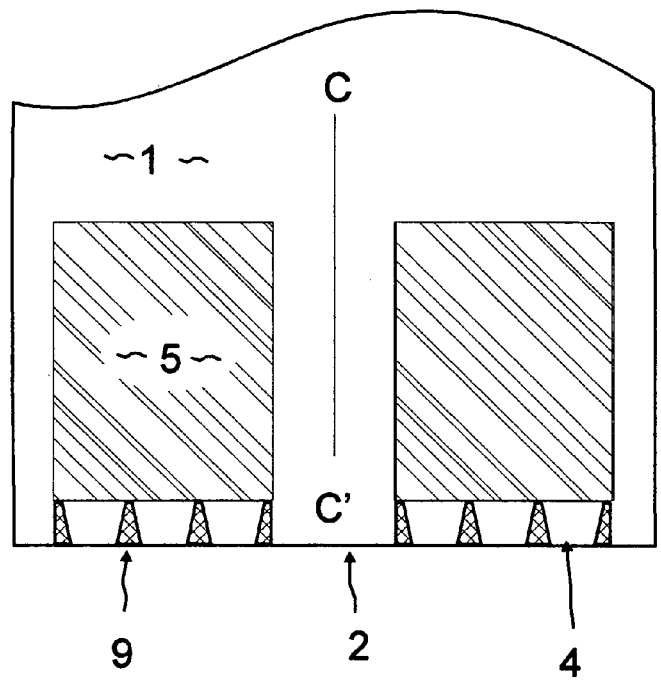
FIG. 7 is a view of the underside of a boat showing an embodiment of the current invention.
Figure 8:
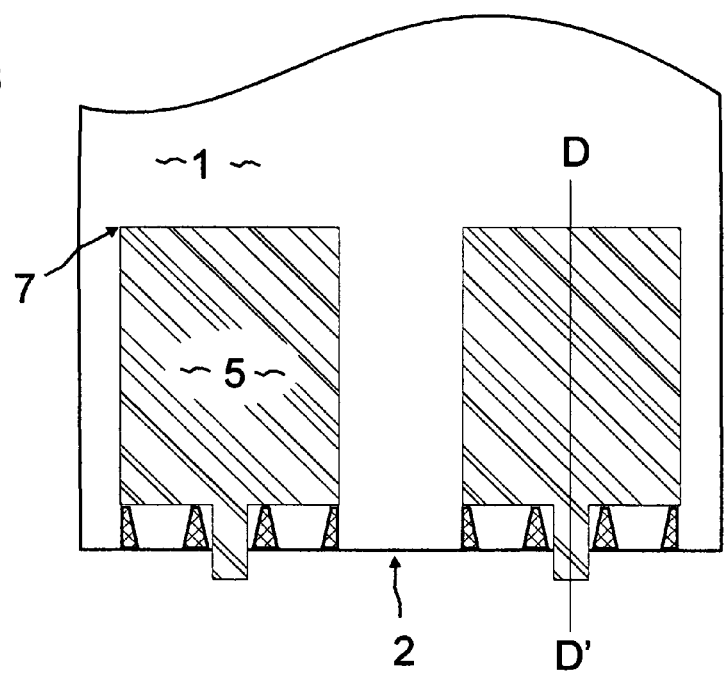
FIG. 8 is a view of the underside of a boat showing an embodiment of the current invention.

In one embodiment of the invention, shown in FIGS. 1, 7 and 8, the boat hull has two gates 5, each positioned lateral to the keel C to C' of the boat as shown in FIG. 7. They are positioned such as not to interfere with conventional running gear of a single propeller inboard boat.

Figure 5:
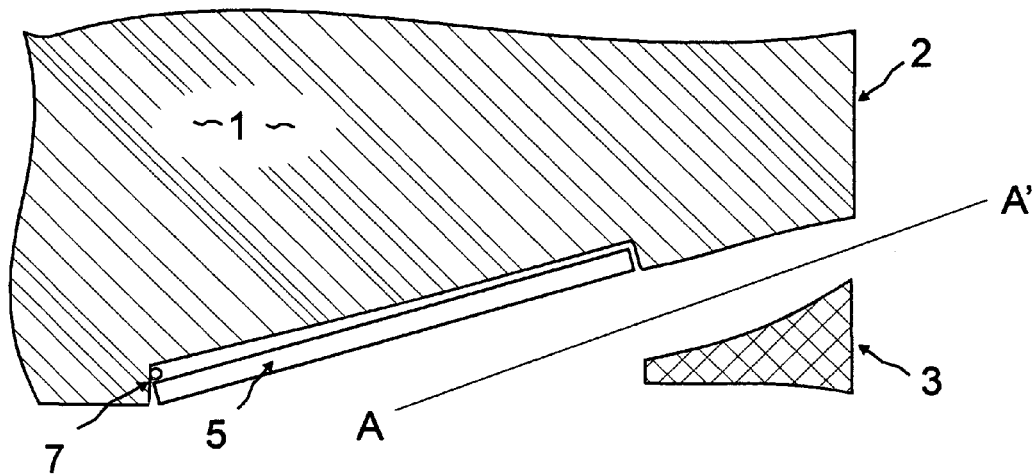
FIG. 5 is a side view showing the gate open with water flowing through the cavity from A to A'.
Figure 6:
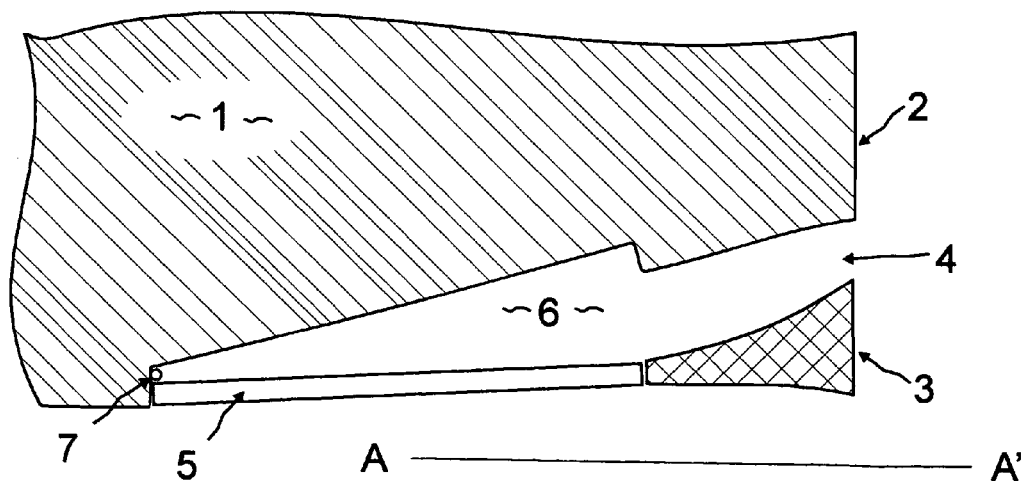
FIG. 6 is a side view showing the gate closed with water flowing below the outer hull from A to A'.
Figure 9:
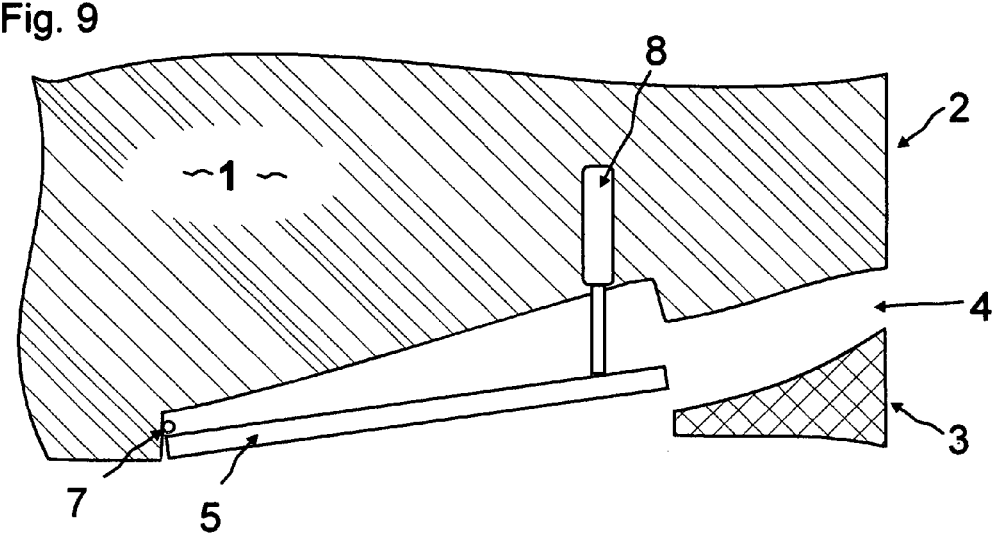
FIG. 9 is a side view showing the gate located at an intermediate position with a linear actuator mounted inboard.

The gates 5 are attached at their fore edge to the hull 1 by a conventional flexible joint, pivot or hinge 7 as shown in FIGS. 5, 6, 8, 9, and 10. Thus affixed, the gate 5 is opened when raised into the cavity 6 as shown in FIG. 5, the gate 5 is closed when positioned flush with the outer hull 20 as shown in FIG. 6, or the gate 5 can be positioned into an intermediate position as shown in FIG. 9.

With the gate 5 in an up or intermediate position, water passing under the forward moving boat passes through the gateway, into the cavity 6 and passes through the exit opening 4 in the proximity of transom 2 of the boat as shown in FIG. 5 where the flow of water is depicted as A to A'. When the gateway is closed, flowing water does not pass into the cavity 6. The flow of water with the gateway closed is depicted as A to A' in FIG. 6.

In this embodiment, the position and shape of the gate 5 conforms to the shape of the outer hull 20 such that in the closed position, the gate 5 is flush with the outer hull 20. In this embodiment the shape of the outer hull 20 duplicates the shape of a conventional tournament ski boat with a slight reverse rocker in the hull near the transom as shown in FIG. 3a. When the gateway is closed, the boat performs as a conventional tournament ski boat.

The outer hull structure 3 can be a single piece construction or composed of multiple pieces attached together, or formed contiguous with the inner hull 10 and the outer hull 20. In this embodiment it is a single piece as shown in FIG. 1 and is attached to the boat hull by conventional fastening means. The outer hull structure 3 can be constructed from any isotropic or anisotropic material. In this embodiment it is constructed from a composite of fiberglass cloth and epoxy resin.

As discussed previously, the floor of the cavity 6 can be inclined (fore to aft) to a degree that counteracts the lifting force generated by the outer hull 20. To enhance the downward force on the boat when the gateway is open, the incline of the floor of the cavity 6 can be increased. In this embodiment, the floor of the cavity 6 is curved, yet the overall angle of inclination is approximately 20 degrees. Different boat hull designs will require different angles of the floor of the cavity 6, ranging from positive 70 degrees to negative 45 degrees.

The cross sectional area of the cavity 6 can remain the same along its course from fore to aft. It is also envisioned that this cross sectional area can either increase or decrease along its course. In this embodiment, the cross sectional area decreases along the course from fore to aft, as shown in FIG. 5. This causes the water velocity to increase as it passes through the cavity 6. Since the water flowing through the exit opening 4 has an increased velocity and the water exits at an upward angle, there is additional downward force exerted upon the boat. In this configuration the boat performs with its maximum displacement hull capabilities.

Detailed Description of Embodiment—Linear Actuator

The movement of the gate 5 is provided by at least one linear actuator 8. A linear actuator 8 can be located inboard as shown in FIG. 9. When located inboard, the moveable shaft of the actuator passes through a watertight packing, or in the alternative, a water resistant actuator can be mounted within a separate watertight opening that is open to the cavity 6, either method utilizing conventional means. The linear actuator 8, the controls of the linear actuator, and the mounting of the linear actuator, both to the boat hull and to the gate, are all conventional. The attachment of the linear actuator 8 is such that it moves the free edge of the hinged gate 5 upward or downward.

With an electrically activated linear actuator 8 controlling the position of gate 5, in conjunction with the engine's throttle, the boat's operator can adjust the degree that the boat rides through the water as a displacement hull or on top of the water as a planing hull, within the boat's design capabilities. If the boat has two or more gates as described in the above embodiments, and the operator wants the boat to produce a large wake on one side of the boat for wake surfing, then the gates can be adjusted differently from each other so as to cause the boat to list and produce a larger wake on one side. An electrically activated linear actuator 8 can also be controlled by a programmable logic circuit.

Alternate Embodiment—Outboard Mounted Linear Actuator

Figure 10:
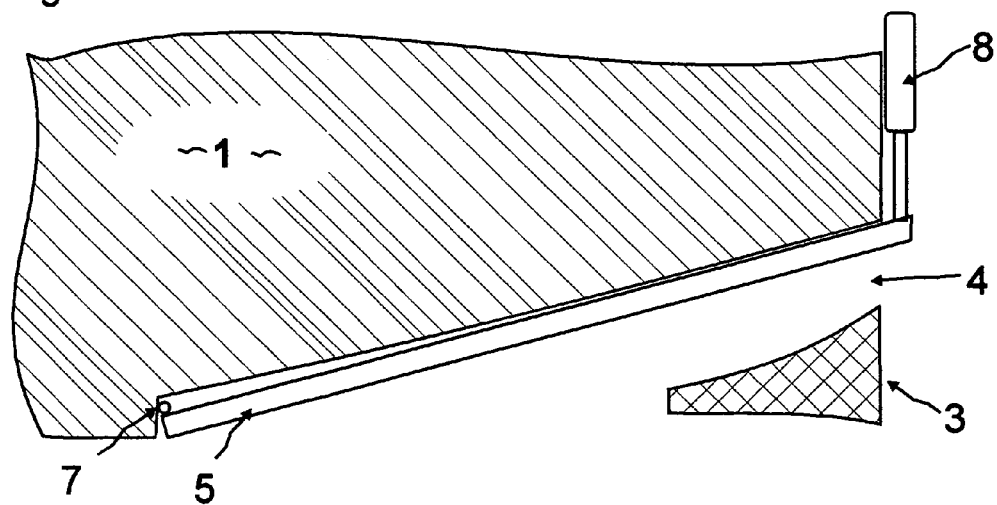
FIG. 10 is a side view showing the gate open with a linear actuator mounted outboard on the transom taken through section D—D' in FIG. 8.

The movement of the gate 5 can also be provided by a linear actuator mounted outboard on the transom 2 as shown in FIG. 10. When mounted outboard, an extension of the gate 5 passes through the exit opening 4 as shown in FIGS. 8 and 10 to attach to the outboard mounted linear actuator 8. The linear actuator, the controls of the linear actuator and the mounting of the linear actuator are all conventional.

Alternate Embodiment—AFT Pivoting Gate

In another embodiment of the invention, the gate 5 is attached at its aft edge to the outer hull 20 as shown in FIG. 2b. Thus affixed, the gateway is closed when the gate 5 is positioned flush with the outer hull 20, and the gateway is open when the gate 5 is positioned downward.

With the gate 5 in an open or intermediate position, water passing under the forward moving boat passes through the gateway, into the cavity 6 and passes through the exit opening 4 in the proximity of transom 2. In this embodiment, the incline of gate 5, when it is in a full open or intermediate position, causes a downward force upon the forward moving boat.

Embodiments not Described

Having described several embodiments of the invention in detail, various modifications and improvements will readily occur to those skilled in the art. Such modifications and improvements are intended to be within the spirit and scope of the invention. Accordingly, the foregoing description is by way of example only and is not intended as limiting. The invention is limited only as defined by the invention's claims and their equivalents.

What is claimed:

1. A boat hull comprising:
   an inner hull which is contained within an outer hull such that a void occurs between the inner hull and the outer hull; and
   where the outer hull has at least one opening which allows water to flow into the void when the boat is moving forward; and
   where there is at least one opening that allows the water to flow out of the void when the boat is moving forward; and
   where there is at least one gate in proximity to the void such that the gate controls the flow of water passing through the void;
   wherein the floor of the void inclines from fore to aft;
   such that water passing over this incline creates a downward force upon the forward moving boat.

2. The boat hull recited in claim 1 wherein the inner hull functions as more of a displacement hull than the outer hull.

3. The boat hull recited in claim 1 wherein the inner hull functions as more of a planing hull than the outer hull.

4. The boat hull recited in claim 1 wherein the cross sectional area of the void decreases from fore to aft;
   such that water flowing through the void in the forward moving boat is accelerated.

5. The boat hull recited in claim 1 wherein the gate, when in the closed position, is positioned within proximity to flush with the outer hull.

6. The boat hull recited in claim 1 wherein the position of the gate is controlled by conventional apparatus selected from the list consisting of:
   a) manually; and
   b) motor driven; and
   c) hydraulic; and
   d) pneumatic; and
   e) any linear actuator; and
   f) any rotary actuator.

7. The boat hull recited in claim 1, wherein elements of the outer hull attach to the remainder of the boat hull with said attachment by conventional means.

8. A boat hull, comprising:
   at least one planar element having a first end, and a second end, such that the first end is attached to the boat hull fore of the second end, and the attachment of the first end is moveable such that the planar element can pivot at its attachment at the first end and the second end can thus move up or down;
   and the hull has a cavity that connects with at least one passageway that exits in the vicinity of the transom of the boat;
   such that the second end of the planar element can be moved downward to a position that blocks the flow of water from entering the cavity when the boat is moving forward; and
   such that the second end of the planar element can be moved upward to a position that allows the flow of water to enter the cavity when the boat is moving forward;
   such that the water subsequently flows through the passageway, and exits in the vicinity of the transom.

9. The boat hull recited in claim 8, wherein the second end of the planar device is connected to a conventional apparatus that moves the second end of the planar device up and down with said conventional apparatus selected from the list consisting of:
   a) manually; and
   b) motor driven; and
   c) hydraulic; and
   d) pneumatic; and
   e) any linear actuator.

10. The boat hull recited in claim 8, wherein the downward movement of the second end of the planer element extends below flush with the outer boat hull;
    such that the planar element acts as a conventional trim tab.

11. The boat hull recited in claim 8, wherein the floor of the passageway inclines from fore to aft;
    such that water passing over this incline creates a downward force upon the forward moving boat.

12. The boat hull recited in claim 8 wherein the cross sectional area of the passageway decreases from fore to aft;
    such that water flowing through the cavity in a forward moving boat is accelerated.

13. A boat hull, comprising:
    at least one planar element having a first end, and a second end, such that the second end is attached to the boat hull aft of the first end, and the attachment of the second end is moveable such that the planar element can pivot at its attachment at the second end and the first end can thus move up or down;
    and the hull has a cavity that connects with at least one passageway that exits in the vicinity of the transom of the boat;

such that the first end of the planar element can be moved upward to a position that blocks the flow of water from entering the cavity when the boat is moving forward; and such that the first end of the planar element can be moved downward to a position that allows the flow of water to enter the cavity when the boat is moving forward;

such that the water subsequently flows through the passageway, and exits in the vicinity of the transom;

wherein the floor of the passageway inclines from fore to aft;

such that water passing over this incline creates a downward force upon the forward moving boat.

14. The boat hull recited in claim 13, wherein the first end of the planar device is connected to a conventional apparatus that moves the first end of the planar device up and down with said conventional apparatus selected from the list consisting of:

a) manually; and
b) motor driven; and
c) hydraulic; and
d) pneumatic; and
e) any linear actuator.

15. The boat hull recited in claim 13 wherein the cross sectional area of the passageway decreases from fore to aft;

such that water flowing through the cavity in a forward moving boat is accelerated.

* * * * *